Figure 1:
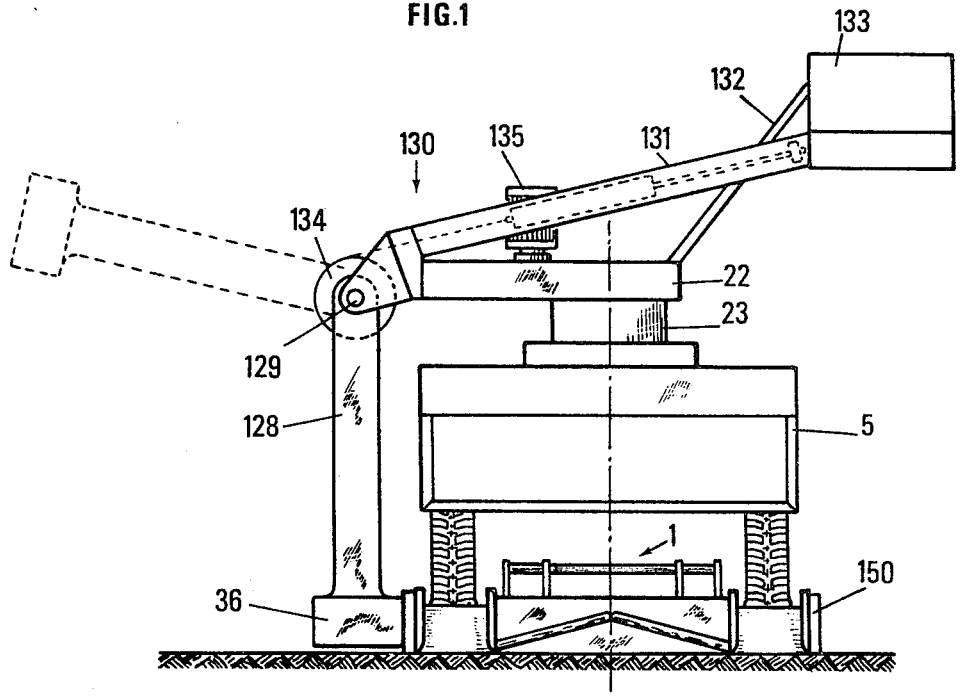

United States Patent [19]

Layotte et al.

[11] 4,118,994
[45] Oct. 10, 1978

[54] MOVABLE DEVICE FOR GENERATING ACOUSTIC SHEAR WAVES IN THE EARTH

[75] Inventors: Pierre-Claude Layotte, Les Mathes; Jacques Cholet, L'Etang-la-Ville, both of France

[73] Assignee: Institut Francais de Petrole, France

[21] Appl. No.: 787,879

[22] Filed: Apr. 15, 1977

Related U.S. Application Data

[63] Continuation-in-part of Ser. No. 724,383, Sep. 17, 1976, abandoned, which is a continuation-in-part of Ser. No. 589,676, Jun. 24, 1975, Pat. No. 4,050,540.

[30] Foreign Application Priority Data

Jun. 27, 1974 [FR] France ................................ 74 22569
Sep. 23, 1975 [FR] France ................................ 75 29470

[51] Int. Cl.² ............................................. F16H 33/00
[52] U.S. Cl. ................................ 74/61; 340/15.5 SW; 181/121; 92/24
[58] Field of Search ............... 340/15.5 SW; 181/121, 181/106, 113, 114; 73/612; 74/61; 92/22, 24

[56] References Cited

U.S. PATENT DOCUMENTS

| | | | |
|---|---|---|---|
| 2,740,488 | 4/1956 | Heaps | 340/15.5 SW |
| 3,419,313 | 12/1968 | Ulusal | 74/61 |
| 3,557,603 | 1/1971 | Carr | 73/12 |
| 3,716,111 | 2/1973 | Lavergne | 340/15.5 SW |
| 3,864,667 | 2/1975 | Bahjat | 345/15.5 SW |

*Primary Examiner*—Benjamin W. Wyche
*Assistant Examiner*—Wesley S. Ratliff, Jr.
*Attorney, Agent, or Firm*—Craig & Antonelli

[57] ABSTRACT

A device for generating shear waves in the earth for seismic prospectives, comprising a target member coupled with the earth, a vehicle carrying a mass and means for driving and guiding the mass along a direction perpendicular to the striking surface of the target member and parallel to the earth surface, said means comprising a toothed wheel in mesh with a driving chain and a counterweight for balancing the mass. According to a particular embodiment, the target member is so designed that at least a part of the vehicle weight can be applied thereon.

9 Claims, 5 Drawing Figures

MOVABLE DEVICE FOR GENERATING ACOUSTIC SHEAR WAVES IN THE EARTH

CROSS-REFERENCES TO RELATED APPLICATIONS

This application is a continuation-in-part of Ser. No. 724,383, Sept. 17, 1976; now abandoned, and which is a continuation-in-part of Ser. No. 589,676, June 24, 1975, now U.S. Pat. No. 4,050,540.

This invention relates to a movable device for generating acoustic shear waves in the earth at a high recurrence frequency.

Seismic prospecting makes use mainly of so-called longitudinal acoustic waves which propagate in depth according to an expansion mode. It is also possible to make use of acoustic waves propagating in depth according to a distortion mode, which are usually called shear waves. Two types of shear waves can be defined:

the shear waves imparting to the particles a horizontal motion whose detected component is perpendicular to the vertical plane passing through the seismic profile, and which are called SH waves, the shear waves which impart to the particles a horizontal motion whose detected component is contained in the vertical plane passing through the seismic profile, and which are called SV waves.

The use of accoustic shear waves is of particular interest. As a matter of fact, shear waves having, at equal frequency, a lower wave length than the longitudinal waves, have, accordingly, a better separating power. In addition, SH waves have the particular feature, under certain conditions, of not undergoing any conversion in the presence of stratigraphic discontinuities. The recordings obtained from these waves are accordingly much more simple.

The simultaneous use of longitudinal and shear waves has the further advantage of making possible the determination of certain physical parameters of the rocks, such as Young's modulus, Poisson's coefficient, the rigidity modulus and compressibility modulus, whose value is very useful to know, particularly in regard to geotechniques.

In copending U.S. application Ser. No. 589,676, there is described a device for generating shear waves in the earth.

It comprises essentially a target member having a surface coupled to the earth and a mass for striking the target member along a direction substantially parallel to the earth surface. The target-member is suspended to articulated arms carried on a supporting vehicle and may be moved vertically from a position adapted for transportation to a working position where it is in contact with the earth. The mass is connected to means for imparting thereto a velocity of a determined amplitude having a component parallel to the coupling surface and whose direction is adjustable with respect to the target-member.

The present invention is essentially an improvement of the device described in copending U.S. application Ser. No. 589,676, comprising new means for imparting to the mass a velocity having a component parallel to the coupling surface with the earth, as well as a new target-element adapted to partially support the carrying vehicle in order to improve its coupling with the earth.

The device comprises a rigid orientable support-member for maintaining the mass in a determined plane perpendicular to the striking surfaces of the target element, an elongate rigid member supporting the mass at one end thereof and means for moving the mass by pivotation of the rigid member with respect to the support member.

It is characterized in that the means for moving the mass comprise a toothed wheel solid with the elongate rigid member and adapted to pivot with respect to the support member and a chain meshing with the toothed wheel and actuated by driving means solid with the support member. The latter is provided with a counterweight on the side opposite to the elongate rigid member.

The target member of the device of the invention is distinguished by the fact that it is provided with tracks for the wheels of the vehicle, adapted to support in operation at least a part of the vehicle weight.

Figure 2A:
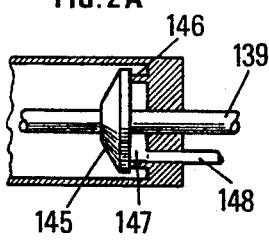
Figure 2:
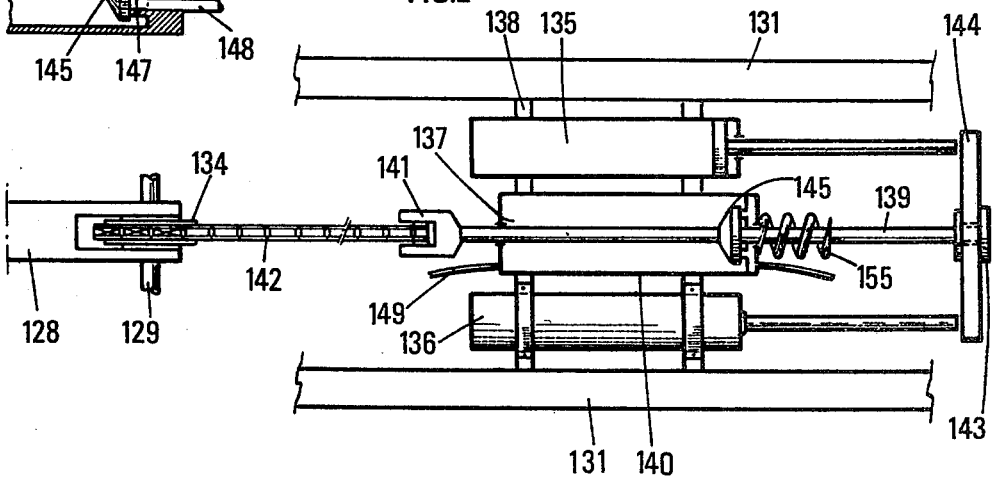
Figure 3:
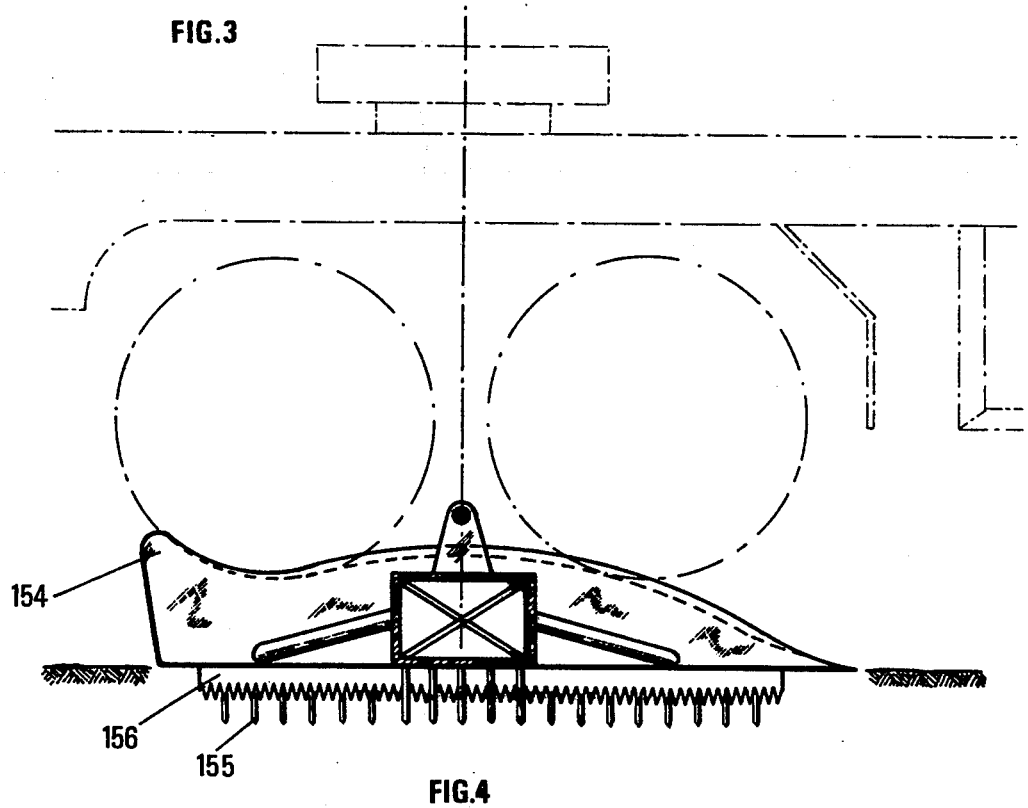
Figure 4:
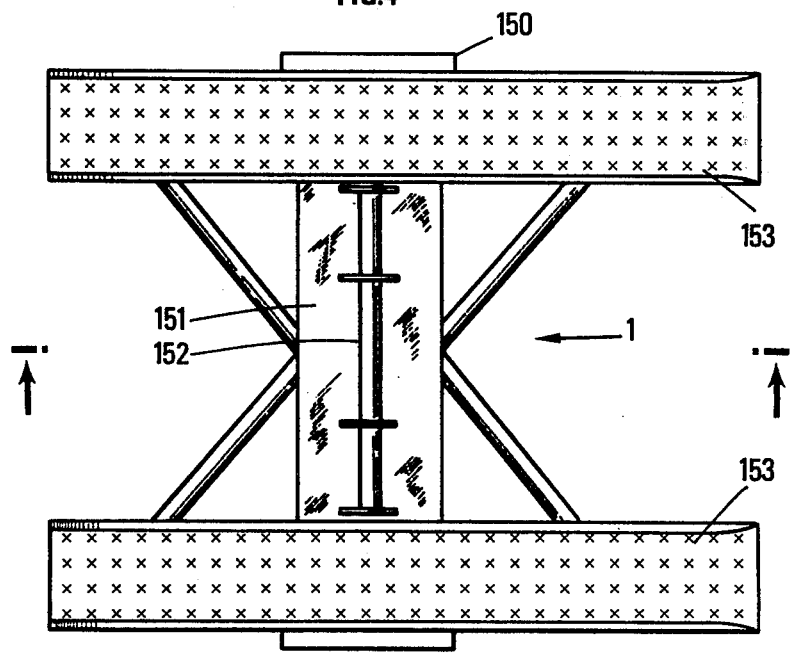

Other features and advantages of the device will be made apparent from the following description of a non-limitative embodiment thereof given with reference to the accompanying drawings, in which:

FIG. 1 diagrammatically shows the device during an operating phase;

FIG. 2 diagrammatically shows, with more details, the system for moving the mass with respect to the target member;

FIG. 2A is a diagrammatic partial view of a jack of the system for moving the mass;

FIG. 3 diagrammatically shows a longitudinal view of the target member and,

FIG. 4 diagrammatically shows a top view of the target-member.

In the embodiment of the handling system illustrated in FIGS. 1 and 2, the mass 36 is solid with one end of an arm 128, the other end of which may pivot about an axle 129, solid with a frame 130, which is carried by platform 22. The frame 130 comprises two arms 131 solid with the platform 22 at one of their ends and secured, at the other end, to supporting arms 132 which take their bearing on platform 22. At their ends solid with the platform, the arms 131 support the pivot axle 129. At the opposite ends, the arms 131 support a counterweight 133.

The arm 128 supporting the mass 36 is solid with a toothed wheel 134 pivotally mounted about axle 129. The position of the pivot axis 129 with respect to the longitudinal axis of the vehicle is so selected that the mass strikes the striking surface 150 of the target member 1 along a direction substantially parallel to the earth surface. A motor 135 is used for moving platform 22 with respect to turret 23 solid with the vehicle.

The system for manoeuvering the mass, shown in FIGS. 2 and 2A, comprises 3 jacks 135, 136 and 137 arranged between the arms 131 and secured to a bearer 138 solid therewith.

The central jack 137 comprises a body 140, a rod 139 longer than the body 140 and passing through the two opposite end walls thereof. At one of its ends, the rod 139 comprises a hook 141 for a chain 142 in mesh with a toothed wheel 134. The other end of the rod is solid with a coupling bar 144. The ends of the rods of the lateral jacks 135 and 136 may press upon the coupling bar and drive it in translation. A spring 155, solid with the end wall of the central jack body, on the side of the coupling bar, surrounds the rod 139. The rod 139 is solid, inside body 140, with a valve 145. The end wall of body 140, on the side of bar 144, is provided with a valve seat 146 having a central recess 147 (FIG. 2A) in which opens a channel 148 for the supply of a pressurized fluid. The diameter of valve 145 is smaller than the inner diameter of body 140 and greater than that of recess 147.

Another channel 149 connected to a pressure source, not shown, opens inside body of jack 137.

The stroke of the rods of the side jacks is so selected that they can drive valve 145 to a position where it is pressed against its seat 146.

For operating the device, platform 22 is rotated so as to bring the support arms 128 in a plane substantially perpendicular to the striking surface 150 of the target member and then the lateral jacks 135, 136 are actuated. The rods come in abutment and press against the coupling bar 144 which drives the rod 139 of the central jack to a position where valve 145 comes in abutment against the valve seat 146. Compressed fluid is introduced into the body of the central jack 137, through duct 149, to press the valve against its seat. During its movement, the rod 139 has driven chain 142 and makes the toothed wheel 134 and the supporting arm 128 to pivot to an upper position. Then jacks 135 and 136 are actuated in reverse direction to move the end of their rods away from the coupling bar. In order to release the hammer fall, fluid at a pressure higher than that prevailing in the body of jack 137, is introduced into recess 147. When valve 145 disengages from its seat, the same pressure prevails on both sides thereof. The mass 36 then freely falls on the target member, driving therewith the rod 139 and the coupling bar 144. The spring 155 damps the quick back motion of the bar.

The system for driving the mass, as above described, make it possible to quickly repeat the successive releases of the mass fall. It also provides for a good synchronization of the releases when several devices are used simultaneously or sequentially.

The target member shown in FIGS. 3 and 4 comprises an elongate transversal caisson 151 whose end surfaces constitute striking surfaces 150.

It is provided at its upper end with a hooking bar 152 which may be secured to two articulated arms 2 (as in FIG. 2 of copending U.S. application Ser. No. 589,676). Two longitudinal caissons 153 whose upper walls form tracks, are secured perpendicularly to caisson 151 near the ends thereof. Their spacing is substantially the same as that of the rear axles of the vehicle. The tracks are so profiled as to provide for an easy climb of the rear section of the vehicle on the target member. A shoulder 154 which may be replaced by a movable shoe, prevents the falling back of the vehicle from the target member along the same direction as when climbing.

Each longitudinal caisson comprises, at its base, several rows of protruding elements, such as nails 155 and at least one saw-tooth shaped blade 156, for ensuring a good coupling of the target-member with the earth. This coupling is improved by the weight of at least a part of the vehicle pressing on caissons 153.

The target member is placed at a location selected for "shots", the vehicle is driven to a position where, through its rear axles, at least a part of the weight of the vehicle is applied onto the tracks. At the end of the operations, the vehicle is moved back until the hooking bar is again vertically below the articulated lifting arms.

We claim:

1. A device for generating shear waves in the earth comprising a target-member having a surface of contact with the earth, a mass for striking the target-member and means for imparting to said mass a speed having a component parallel to said contact surface, including movable actuating members, orientable with respect to the target-member, for maintaining the mass in a plane containing the target-member and control means for lifting the mass above the target-member and orienting its fall towards the target-member, and wherein the means for moving the mass by pivoting an elongate rigid member with respect to the support member comprises a toothed wheel solid with the elongate rigid member and pivotable with respect to said support member, a chain in mesh with said toothed wheel and actuated by driving means solid with the support member, said support member being provided with a counterweight on the side opposite to the elongate rigid member.

2. A device according to claim 1, wherein the chain driving means comprises a first jack whose rod is solid with the chain and means for moving the rod of said first jack and for stopping it intermittently.

3. A device according to claim 2, wherein the means for moving the rod of the first jack and for stopping it intermittently comprises at least a second jack and a coupling system to make the rods of the first and second jacks solid in translation along a single direction, and a valve secured to the rod of the first jack inside the body thereof which is provided on its end wall with a seat having a recess for said valve and means for delivering a pressurized fluid to the inside of the first jack body and of said recess.

4. A device according to claim 3, wherein the coupling system comprises a coupling bar solid with the rod of the first jack, the rod of the second jack being adapted to press intermittently on the coupling bar, thereby moving the same.

5. A device according to claim 4, further comprising means for braking the movement of the coupling bar.

6. A device for generating seismic shear waves in the earth comprising a mobile supporting structure to which are secured a target-member having a surface of contact with the earth, a mass for striking the target-member and means for imparting to said mass a speed having a component parallel to said contact surface, including movable actuating members, orientable with respect to the target-member, for maintaining the mass in a plane containing the target-member and automatic control means for lifting the mass above the target-member and orienting the mass above the target-member and orienting its fall towards the target-member, and wherein said mobile supporting structure is a self-propelled vehicle the target-member being supported by two arms rigidly connected to the vehicle at one of their ends and driving means for rotating the target-member from a position of contact with the earth to a lifted position, and the target-member comprises tracks for the vehicle wheels, adapted to support at least a part of the vehicle weight.

7. A device according to claim 6, wherein the target-member comprises a hooking bar adapted to be secured to the vehicle for the transportation of said target-member.

8. A device according to claim 6, wherein the surfaces of the target-member in contact with the earth are provided with protruding elements.

9. A device according to claim 8, wherein the protruding elements consist of nails and saw-tooth shaped blades.

* * * * *